April 4, 1967     W. W. CAMPBELL ETAL     3,311,994
HEAT TRANSFER UNIT

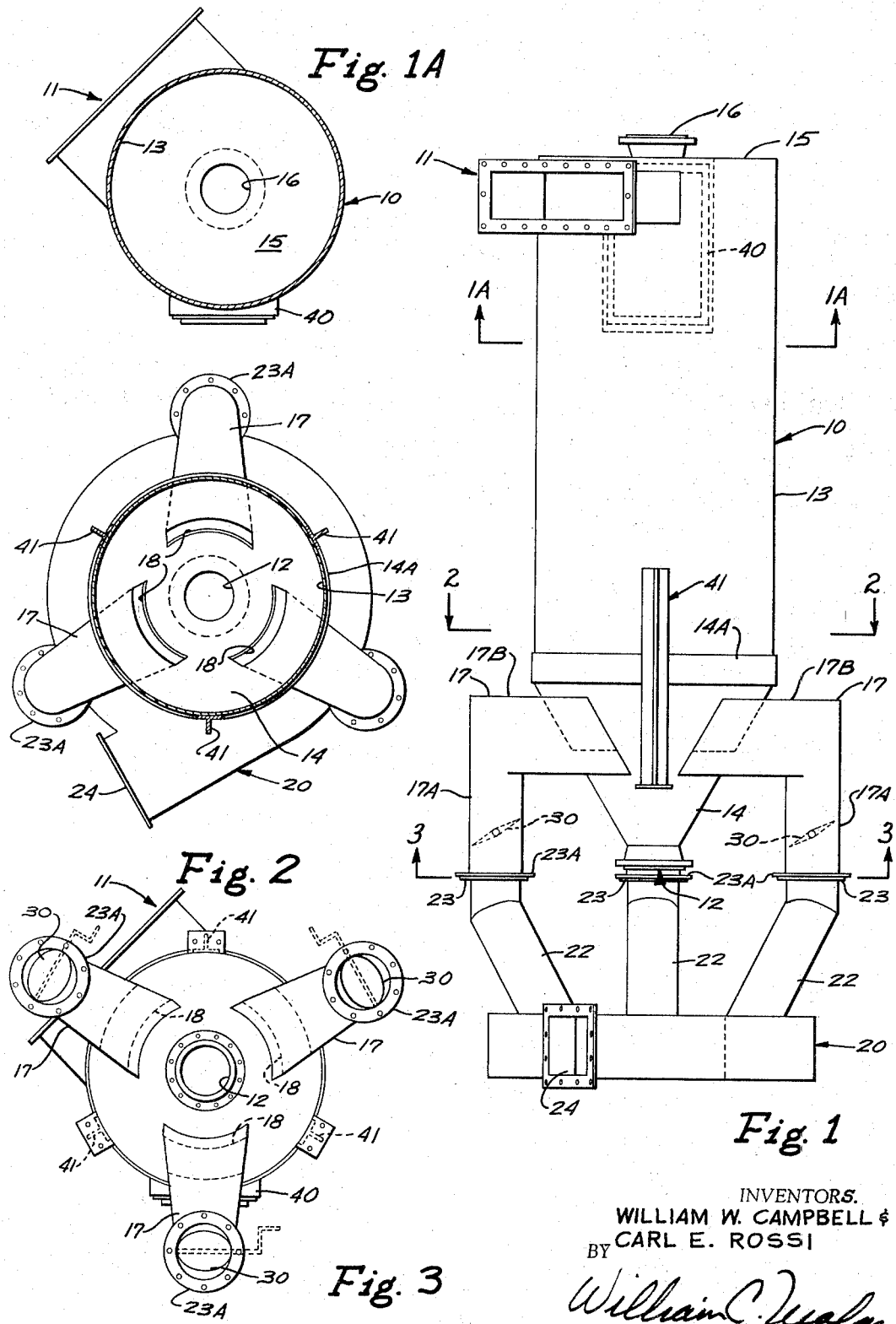

INVENTORS.
WILLIAM W. CAMPBELL &
CARL E. ROSSI
BY
ATTORNEY

3,311,994
HEAT TRANSFER UNIT
William W. Campbell and Carl E. Rossi, Ludington, Mich., assignors to Harbison-Walker Refractories Company, Pittsburgh, Pa., a corporation of Pennsylvania
Filed May 4, 1965, Ser. No. 453,134
4 Claims. (Cl. 34—168)

This invention relates to heat exchange apparatus. More particularly, in one embodiment, this invention relates to novel construction of apparatus for the rapid and efficient cooling of very high temperature dead burned refractory aggregate and the like.

Many commercially practiced contemporary manufacturing processes deal with high temperatures in the treatment and/or manufacture of relatively small particles or aggregates. For example, contemporary metallurgical processes, in particular newer steelmaking processes, demand very high purity refractory. For example, dead burned magnesia of well developed crystalline periclase characteristics. By "high purity" it is meant at least 96% MgO, by weight, on an oxide basis and preferably even higher.

Such high purity materials, except for rather small foreign deposits, are not readily available and thus the refractory must be synthetically manufactured. Such manufacturing is accomplished in a variety of ways. For example, according to known techniques, magnesian values are recovered from seawater by reaction with such as dolomite. A reaction product predominantly magnesian in character, is then briquetted, or may be slurried and passed through a rotary kiln, for firing temperatures of 3000° F. and more to form a plurality of relatively small dense aggregate particles.

Another method of recovering high purity magnesian values is by the so called "carbonate" processes. In this process, raw materials including a substantial magnesian value are selectively calcined to provide a relatively chemically reactive MgO value. This calcined material is passed in counter-current contact with water and carbon dioxide whereby magnesian values are dissolved. The dissolved magnesian values are then subjected to treatment steps to precipitate a very high purity (as high as 99% MgO on an oxide basis) insoluble magnesian carbonate. This carbonate material is then calcined. The resulting calcined MgO is subjected to very high temperature burning to produce the desired dead burned periclase product useful in the manufacture of refractories.

A process which is particularly satisfactory in the treatment of high purity material to recover hydration resistance, dense dead burned magnesian grain, is disclosed and claimed in U.S. Patent 3,060,000. The process of this patent requires an initial calcination stage, a briquetting stage in which the calcined material is formed into the relatively small pillow or almond shape briquettes, which briquettes are then dead burned in a shaft kiln. The shaft kiln conventionally operates at temperatures in excess of 3000° F. In fact, temperatures of over 3500° F. are not unusual. The dead burned briquettes as they discharge from the shaft, are still extremely hot. They are brilliant red in color. There has been a need for an efficient and rapid means for cooling these briquettes so they can be rapidly prepared for shipment or placed in suitable storage areas. As one can well imagine, there is an enormous quantity of heat which must be dissipated in order to lower the temperature of these briquettes from their cherry red condition as they exit from the shaft kiln to ambient temperatures on the order of 70–100° F. It has been suggested that they be passed through a water quench. However, this has not been particularly desirable. There is excessive fracturing of the briquettes as they are passed into the water bath. There is the possibility of hydration, i.e. conversion of the MgO to $Mg(OH)_2$. Further, when cherry red briquettes are passed into a water bath billows of steam and hot water spray make working conditions in the area undesirable if not dangerous. Still further, industrial processes which require water which cannot be recovered are in many areas of this country looked upon with disfavor.

Another prior suggestion for cooling of the briquettes issuing from the shaft kiln has included passing them through a relatively long inclined rotating conduit or cylinder. This cylinder would have interior baffles or helices to assist in tumbling of the briquette charge. Even with this arrangement, it is often necessary to employ water spray on the shell of the rotating drum to cool it. Yet further, the tumbling action of the charge of hot briquettes can cause excessive breakage and dust, and thus accumulation of undesirable fine constituents which could not be satisfactorily or economically recovered.

Another undesirable aspect of both of the foregoing prior art arrangements was the relatively large space requirement.

Accordingly, it is an object of the present invention to provide improved method and apparatus of the heat exchanger type. It is another object of the invention to provide improved highly efficient heat exchanger apparatus particularly suited for the cooling of high temperature aggregate. It is still another object of the invention to provide apparatus of the type described which requires relatively small space, does not require water for most operations, and which when used for cooling such as dead burned basic refractory briquettes issuing from such as a shaft kiln, does not promote excessive breakage and dusting; and which is capable of capturing such dust as does form in an efficient manner.

Briefly, according to one aspect of this invention, there is provided apparatus of the heat exchanger type. The apparatus consists of an upright tubular member preferably circular in cross section and having a closed top and a truncated conical lower end. A feed opening is formed through the closed top. A gas discharge opening is likewise provided adjacent the top of the apparatus. A substantially centrally located aperture at the bottom of the appartus serves as a discharge.

Associated about the bottom of the apparatus is an air distribution system. The distribution system consists essentially of a plurality of air confining conduits which open through the truncated conical bottom section of the apparatus. These air confining conduits are symmetrically arranged with respect to the vertical axis of the tubular section. They are further so constructed and arranged as to provide a substantially uniform bed of cold air at about the point of intersection of the tubular member and the lower conical section thereof.

Briquettes or aggregate to be cooled are fed in through the top and move downward in countercurrent relation with upwardly moving air. All briquettes pass through the cold bed of air just mentioned. This arrangement provides for substantially uniform cooling across the apparatus and to a large degree prevents channeling which is often associated with upright countercurrent air solids systems.

The apparatus further includes a manifold arranged for delivery of cold air to the symmetrically arranged air introduction conduits and to assure that substantially uniform pressure exists across the three conduits.

A better understanding and other features and advantages of heat exchange construction according to the concepts of this invention will become readily apparent to those skilled in the art from a study of the following detailed explanation with reference to the appended drawings. In these drawings:

FIG. 1 is a side elevation of apparatus constructed according to the concepts of this invention; FIG. 1A is a sectional view along the line 1A—1A of FIG. 1;

FIG. 2 is a sectional view along the line 2—2 of the apparatus of FIG. 1;

FIG. 3 is a sectional view along the line 3—3 of the apparatus of FIG. 1;

Figure 4:
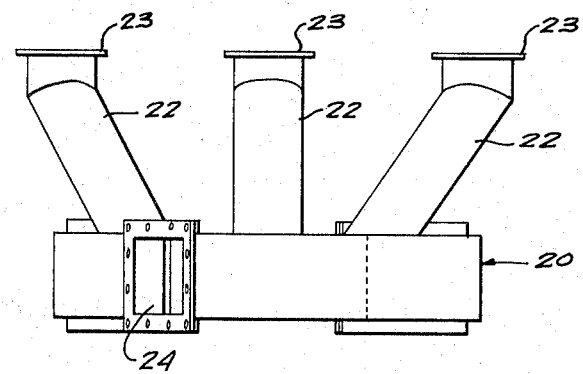
FIG. 4 is a side elevation of the cold air manifold of the apparatus of FIG. 1.

Before describing the drawings in detail, it should be understood they are but exemplary of apparatus constructed according to the concepts of this invention and that design changes may be had which would still embody the concepts of the present invention. It should be thus understood the true spirit and scope of the invention is not limited to the drawings, but rather is as defined in the hereafter appended claims.

In FIG. 1 there is shown an upright, elongate, heat transfer apparatus 10 constructed according to the concepts of this invention. It consists of the generally circumferential upright tubular shell 13 having a truncated conical lower portion 14 terminating in a discharge orifice 12. The top of the tubular shell 13 is closed by an apertured plate 15 having a centrally located feed inlet 16. To one side of the feed inlet 16, and opening through a substantial cord of the wall of the shell 13 is the gas discharge 11. The cross sectional configuration of the major portion of the gas discharge 11 is rectangular. When it is stated that it opens through a "large" portion of the upper wall of the shell 13, it is meant on the order of at least about one quarter of the circumference of the shell 13.

Opening through the bottom of the vessel, slightly below the point of interconnection between the shell 13 and member 14 are a plurality of symmetrically arranged cooling air conduits 17. Three are shown in the drawings. There may be more as is explained in more detail hereafter, but they should always be substantially symmetrically arranged. These three conduits 17 are generally rectangular in cross section adjacent the point of interconnection with the conical portion 14. The apertures 18 interconnecting the conduit 17 and the conical portion 14 are generally rectangular. Of course, they are not truly rectangular since they open through a curved surface, but they do approach such and it is not considered misdescriptive to call them rectangular since they are bounded by two parallel, relatively long upper and lower edges interconnected by the two parallel, relatively short edges.

It is important to this invention that this generally rectangular configuration be present as is discussed in more detail below in explaining the theory of operation of the apparatus of this invention.

Figure 6:
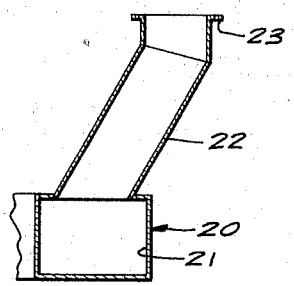
FIG. 6 is a fragmentary side sectional view along the line 6—6 of FIG. 5.
Figure 5:
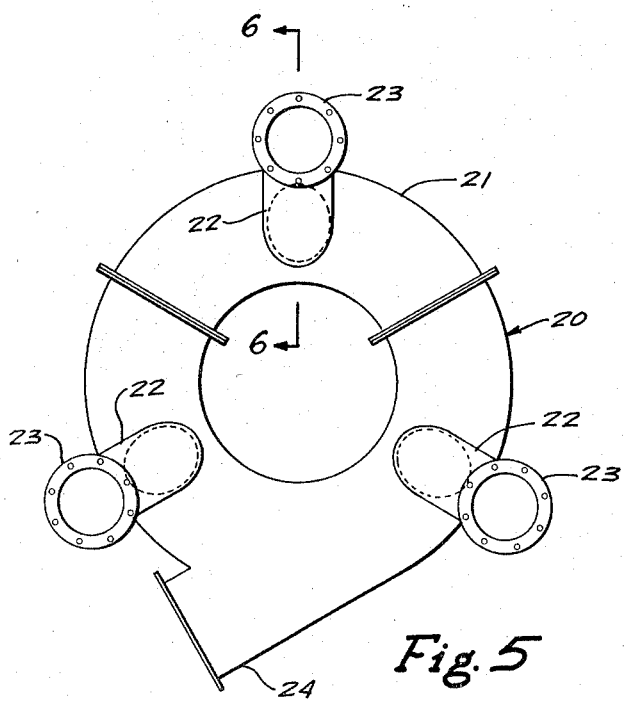
FIG. 5 is a top view of the manifold of FIG. 4.

The other ends of the conduits 17 are arranged for flanged interconnection with the cold air distribution manifold 20 which is best seen in FIGS. 4 through 6. This manifold 20 is comprised of generally doughnut shaped distribution passage 21 having three symmetrically spaced upwardly extending legs 22 which interconnect with the conduits 17 by bolt interconnection through the flanges 23 and 23A carried respectively by the conduits 22 and 17.

The doughnut shaped member 21, via tangential inlet 24, is connected with a source of cold air which is not shown in the drawings. Suitable baffle members 30 are mounted in the downwardly extending legs 17A of conduit 17 to provide better control of air flow into the bottom of the apparatus 10. The legs 17A are preferably more circular as distinguished from the more rectangular cross sectional configuration of the legs 17B of the conduit 17. It thus becomes apparent that the conduit 17 can be described as generally of inverted L-shape and in which the leg, which opens through aperture 18 into the cone section 14, is at substantially right angles to the vertical axis of the apparatus 10.

An inspection door 40, adjacent the top of the apparatus, and support structure, such as the leg 41 at the bottom, are also provided. Yet further, in preferred construction the generally truncated conical bottom member 14 has an upper lip of flange 14A which is slightly larger in cross section than the shell 13, whereby the shell can be inserted into the flange 14A and suitably attached as by welding or riveting to the cone section.

The operation and theory behind the superior results obtained with apparatus according to this invention are believed better understood by description of its operation with respect to an exemplary installation. For example, the apparatus may be assembled in a manufacturing complex including a shaft kiln for dead burning refractory briquettes according to a process as is disclosed in U.S. Patent 3,060,000 or 3,060,042. As the briquettes discharge from the bottom of the shaft kiln they are conveyed into feed inlet 16 of the apparatus at a rate of about 8 tons an hour. The temperature of the briquettes as they enter the inlet 16 is about 1000° F. Cold air (air at about 70-100° F.) is substantially uniformly fed through the three conduits 17 into the bottom of the vessel at about 5000 cubic feet per minute. A four p.s.i. blower or pump is adequate to obtain this air flow rate in apparatus, for example, of about 15 feet in vertical extent measuring from the bottom of the manifold to the top of the apparatus. The interior diameter of the shell 13 of such a vessel would be on the order of 4 feet.

Briquettes are discharged from the orifice 12 at a temperature on the order of 70-100° F. Heated air leaves the vessel through outlet 11 at about 700° F.

One rather remarkable aspect of apparatus according to this invention is substantial elimination of channeling of gases up through the descending charge of briquettes. To those familiar with vertical vessels of the heat recuperative type, and also to those familiar with shaft kilns, it will be understood that "channeling" refers to that phenomena existing in such vessels when there is not a uniform temperature gradient of the upwardly moving gases across the vessel. This can be a distressing thing in some operations since it is self-perpetuating, i.e. once cooler air begins to establish a preferred flow path, interior circulation of air tends to flow the established path in greater and greater volume and velocity. When this occurs, for example in a shaft kiln, it can result in very hot briquettes moving downward against one wall and relatively cold ones moving downward against another wall of the same apparatus.

To a large extent, channeling is overcome in apparatus according to our concepts in two ways. First, the manner in which the cold air inlet orifices 18 are arranged seems to assure a bed or "pool" as it were, of substantially uniform temperature gradient cold air entirely over the cross section of the upper portion of the cone 14. This phenomena, together with the configuration and size of the air discharge 11, appears to prevent channeling of the upward moving gases. And the gas outlet 11 does play a large part, it is believed, in preventing the channeling. It is of such large extent that the velocity of exit gases passing therethrough is quite low, at least as compared to the velocity of the air entering through the apertures 18. Further, since the gas velocity is relatively low, there is not appreciable carryover of fine particles and dust in the exiting hot gas stream.

Another desirable aspect of the apparatus of this invention is that there is substantially no breakage or fracturing of the briquettes in their downward passage through the treatment chamber as one expects to occur in such as prior art rotary drum cooling vessels.

Further describing the exemplary installation started above, both the inlet and discharge orifice 16 and 12, respectively, will have an inside diameter on the order of 12″, perhaps a little less. The height of the cone measuring from discharge orifice to the bottom of the shell 13 is about 3', and the dimensions of the orifices 18 will be about 5" in height and about 20" in width.

The diameter of the vessel 13 relative to its height is important. If the diameter is too wide as compared to height, channeling can develop simply because it does not seem possible to introduce sufficient air through the orifices 18 to develop the substantially uniform bed of cold air which has been described above. Of course, diameter will vary from installation to installation.

For our exemplary installation, the size of the particles of material being treated should also be considered. It is suggested that particles on the order of about 3/8" diameter, or length considering the more almond shaped briquettes more conventionally obtained from shaft kilns, are preferred.

If particles are too fine they are apt to be carried out through the gas discharge even though the velocity thereof is relatively low; and if the diameter of the particles is too large, heat transfer between gas and solids is not as good as might be desired.

In the foregoing exemplary discussion, the apparatus of this invention has been considered to be operating as a cooler. It is equally applicable for a heating role in which hot gases are introduced through the bottom and cooled particles through the top. We have just mentioned "particles." We have given exemplary sizes above, but believe the word "granular" in describing the particles is apt since it excludes fine powders.

While three conduits 17 are shown in the drawings, it should of course, be understood there is nothing particularly critical about this number. It is essential, however, that the cold air be introduced symmetrically, or substantially symmetrically, into the bottom of the apparatus. Four and more conduits 17 could be used as long as they were properly arranged, their inlet apertures were generally rectangular in shape and of sufficient extent to form the uniform bed of cold air discussed above. Even two conduits could be used. Each would open through substantially entirely a semi-circular segment of the cone 14 but it is believed that structural reqirements, i.e. strength of materials would become a serious problem with such an arrangement. In essence, however, there is provided cold air inlet means about the bottom of the apparatus substantially in the top of its lower cone section which means is so arranged and of such configuration as to assure the formation and maintenance of a substantially uniform bed or "pool" of cold air entirely across the bottom of the apparatus. As can be seen by reference to the drawings, the space or area in the conical bottom into which the apertures 18 open is unobstructed by any apparatus or structural element. When it is stated that the bed of air is "substantially uniform," it is intended to describe substantially uniform temperature gradient, depth and density.

In installations where higher temperatures are to be encountered in either a colling or heating operation, it may be desirable to line the interior of the vessel 10 with refractory which is chemically compatible with the materials being treated and, of course, which is sufficiently refractory to withstand temperatures of use.

Having thus described the invention in detail and with sufficient particularity as to enable those skilled in the art to practice it, what is desired to have protected by Letters Patent is set forth in the following claims:

We claim:

1. A vessel of the type described, including an upright tubular member of substantial vertical extent, said tubular member having a closed top through which opens a feed orifice, the bottom of the tubular member tapering to a bottom discharge orifice to form a substantially truncated conical bottom section, there being a gas discharge orifice adjacent an upper portion of the vessel and air inlet means adjacent the bottom, said air inlet means constructed and arranged to form a substantially uniform bed of treatment gas substantially entirely across an area adjacent the bottom of the vessel, and means forming said gas discharge orifice being of sufficient extent to substantially reduce velocity of gases exiting from the apparatus to such extent as to prevent carryover of solid materials being treated in said apparatus, said air inlet means comprised of a distribution section and a manifold section, said distribution section comprised of a plurality of conduits attached symmetrically about the conical bottom section, each of said conduits opening directly into said bottom section through substantially rectangular apertures formed through said conical bottom section, respective upper and lower edges, which in part define said rectangular apertures falling in common, parallel respective upper and lower planes, which planes are perpendicular to the vertical center line of said tubular member, the space within said bottom section between said rectangular apertures being unobstructed so a substantially uniform bed of treatment gas can be formed between said apertures, and said manifold section interconnected with said distribution section and arranged to deliver cooling gases thereto.

2. The apparatus of claim 1 in which each of said conduits opening to said rectangular apertures is of generally inverted L shape in which one arm of the L is substantially at right angles to the vertical center line of said tubular member.

3. The apparatus of claim 1 in which said tubular member is substantially circular in cross section and said gas discharge opens through a chord of said tubular member equal to at least about 1/4 the circumference of said tubular member.

4. Apparatus of the type described including an upright tubular vessel of substantial vertical extent, a closed top through which opens a feed orifice, a bottom which tapers to a discharge orifice to form a substantially truncated conical bottom section, and a gas discharge orifice adjacent an upper portion of the vessel, there being air inlet means adjacent the bottom, said air inlet means being comprised of a plurality of symmetrically arranged air inlets opening through said tapering bottom, space between said air inlets being unobstructed whereby a substantially uniform bed of treatment gas can be formed entirely across said space between said air inlets adjacent the bottom of said vessel, and said gas discharge orifice being of sufficient extent to substantially reduce the velocity of gases exiting from the apparatus to such an extent as to prevent carryover of solid materials being treated in the apparatus.

References Cited by the Examiner

UNITED STATES PATENTS

| 988,671 | 4/1911 | Staunton | 34—168 |
| 2,602,242 | 7/1952 | Dok | 34—168 X |

FOREIGN PATENTS

| 694,847 | 7/1953 | Great Britain. |

FREDERICK L. MATTESON, Jr., *Primary Examiner.*

C. R. REMKE, *Assistant Examiner.*